(12) United States Patent
Reineke et al.

(10) Patent No.: US 12,061,926 B2
(45) Date of Patent: Aug. 13, 2024

(54) PROGRESSIVE WORKLOAD MIGRATION RECOMMENDATION BASED ON MICROSTEP SCORE

(71) Applicant: EMC IP Holding Company LLC, Hopkinton, MA (US)

(72) Inventors: Nicole Reineke, Northborough, MA (US); Corinne Schulze, Hopkinton, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 305 days.

(21) Appl. No.: 17/446,374

(22) Filed: Aug. 30, 2021

(65) Prior Publication Data
US 2023/0061364 A1 Mar. 2, 2023

(51) Int. Cl.
G06F 9/46 (2006.01)
G06F 9/48 (2006.01)
G06F 9/50 (2006.01)

(52) U.S. Cl.
CPC .......... *G06F 9/4875* (2013.01); *G06F 9/5083* (2013.01)

(58) Field of Classification Search
CPC ............................. G06F 9/4875; G06F 9/5083
See application file for complete search history.

(56) References Cited

U.S. PATENT DOCUMENTS

| | | | |
|---|---|---|---|
| 2018/0101214 A1* | 4/2018 | Mahindru | G06F 9/5094 |
| 2018/0167261 A1* | 6/2018 | Abbondanzio | H04L 41/0631 |
| 2019/0026091 A1* | 1/2019 | Gao | G06F 9/45533 |
| 2021/0373971 A1* | 12/2021 | Lu | G06F 9/5077 |

* cited by examiner

*Primary Examiner* — Tammy E Lee
(74) *Attorney, Agent, or Firm* — Workman Nydegger

(57) ABSTRACT

One example method includes discovering computing workloads that are available to migrate from a current platform to a target platform, and the workloads are controlled by a user, determining that the computing workloads are migratable from the current platform to the target platform, ordering the computing workloads according to a respective measurable aspect, such as SLA (Service Level Agreement) for example, of each of the computing workloads, and generating a recommendation to the user that one of the computing workloads be migrated to the target platform, and the recommendation is generated based on a microstep score that has been assigned to the user.

18 Claims, 2 Drawing Sheets

PROGRESSIVE WORKLOAD MIGRATION RECOMMENDATION BASED ON MICROSTEP SCORE

FIELD OF THE INVENTION

Embodiments of the present invention generally relate to information technology systems workload management. More particularly, at least some embodiments of the invention relate to systems, hardware, software, computer-readable media, and methods for progressive migration of workloads based on user amenability.

BACKGROUND

Adoption of new technology or implementations can be met with human resistance due to anxiety response. For example, current workload migration suggestions for repatriation do not take into account the comfort level of the impacted users, or the unstated resistance of the user to the change. Thus, adoption and movement of workloads may be impacted by a lack of user comfort with such a change.

At present, workload migration suggestions do not take into account the criticality of a workload and the relationship of the workload, and its criticality, to a human decision. Thus, the implementation of information technology actions that are technically sound and important may be impaired, or prevented, as a result of human resistance to changes implicated by those actions.

Finally, workloads tend to stay in their current location, and IT personnel often do not want to introduce change where it is not necessary, or at least where it is believed to be unnecessary. For this reason, resources in some storage and/or computing environments may not be fully consumed or optimally utilized by workloads that otherwise reside in so-called hyperscalers, that is, environments where the consumption of storage and/or computing resources is scaled up or down to meet needs. That is, there is a likelihood of underutilized resources in some storage and/or computing environments which may not be likely in other environments, such as a hyperscaler environment like AWS (Amazon Web Services) where customers only buy the storage or computing resources that they utilize, and no more.

A related concern is that hosting and support costs in hyperscaler environments go up over time. Thus, even if a customer is only buying the storage or computing services that they need, their costs will nonetheless increase.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
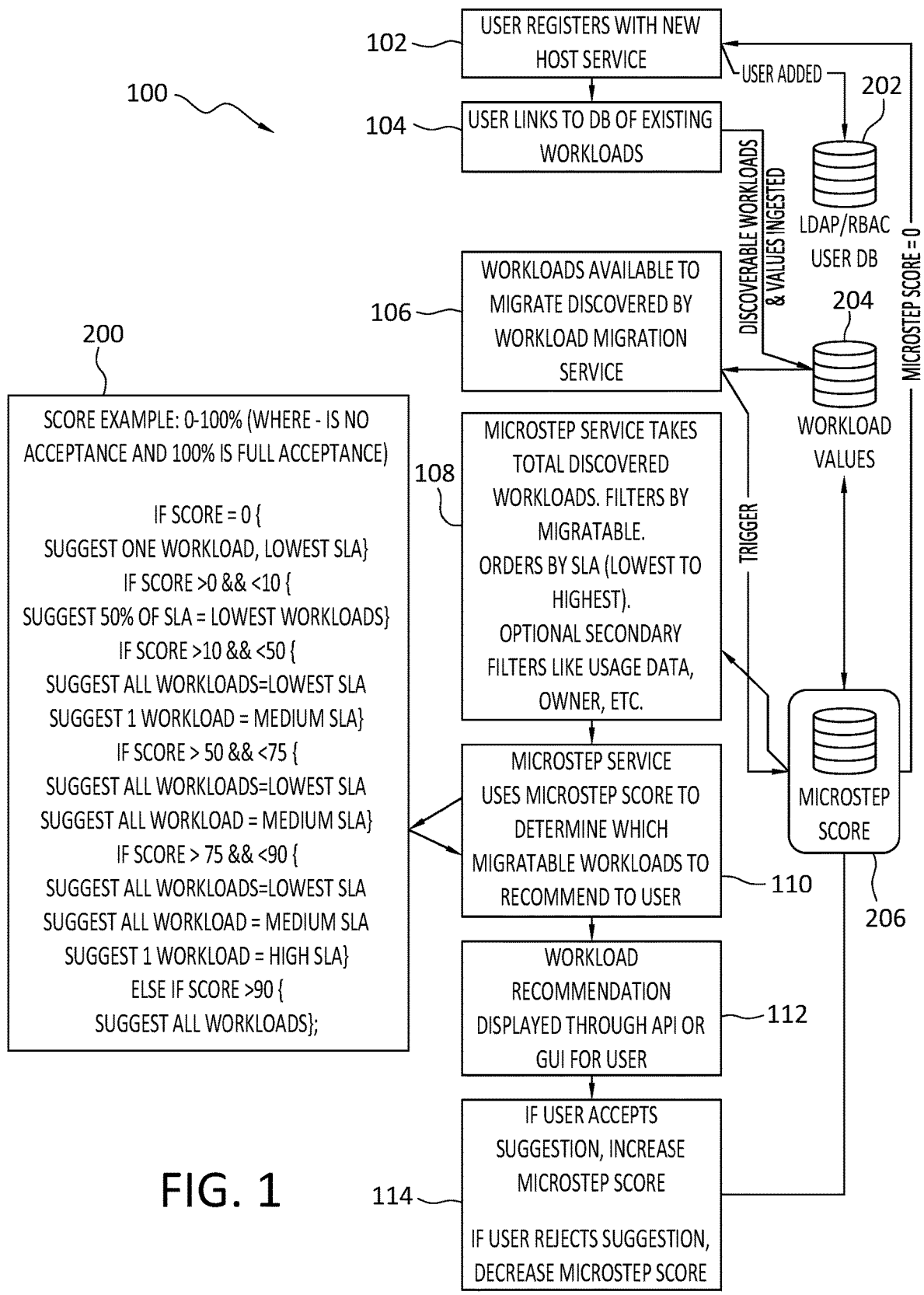
FIG. 1 discloses aspects of an example method and architecture according to some embodiments.

Embodiments of the present invention generally relate to information technology systems workload management. More particularly, at least some embodiments of the invention relate to systems, hardware, software, computer-readable media, and methods for progressive migration of workloads based on user amenability.

In general, example embodiments of the invention may create a microstep score for migration of discovered workloads from a known provider or host to a new provider or host. The migration may be effected so as to improve resource utilization, and/or to improve workload performance, for example. Various processes may be performed using, or based on, a microstep score.

For example, the microstep score, which may correspond to a particular user or group, may be used to generate progressive microstep recommendations for the progressive migration of one or more workloads. Particularly, the microstep score may be compared with discovered migratable workload characteristics, such as usage, adoption of suggestion, usage data, and SLA, for example. Discovered migratable workloads may then be broken down to recommend an ordered list that is aligned to the microstep score.

As well, a microstep score may be used to trace the adoption, by a user, of workload migration suggestions. The microstep score and trace information may be used, for example, to increase a safety score where a recommendation was adopted, and to decrease a safety score when adoption is not suggested.

Finally, the microstep score may be used to update the next micro-recommendation based on the safety score. Additional and alternative uses of a microstep score will be apparent from this disclosure.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that a technology change, such as migration of a computing workload from one platform to another platform, for example, may be implemented notwithstanding resistance of a user, who may be involved with the technology, to the technology change. An embodiment may provide for incremental implementation of a technology change, such as a workload migration for example, based on increasing comfort of a user with the technology change. In this way, the change may be implemented while also taking into account a reaction, of an affected user, to the change. An embodiment may take into account the criticality of a workload, and a relation between that criticality and a human decision concerning the workload. An embodiment may operate to increase, or at least suggest an increase, in consumption of resources based on a safety score associated with a workload that consumes the resources. Various other advantages of example embodiments will be apparent from this disclosure.

Nothing herein should be construed as teaching or suggesting that any aspect of any embodiment of the invention could or would be performed, practically or otherwise, in the mind of a human. Further, and unless explicitly indicated otherwise, the disclosed methods, processes, and operations, are contemplated as being implemented by computing systems that may comprise hardware and/or software. That is, such methods, processes, and operations, are defined as being computer-implemented.

A. Overview

In a well-documented phenomenon, human anxiety generates a resistance to change. See, https://www.counselling-directory.org.uk/memberarticles/anxiety-a nd-resistance-to-change. This applies to both personal change, and the resistance to adoption of new technologies.

For example, while the general idea of cloud computing itself is not a new technology, the customer-base nonetheless perceives the movement of a workload from one cloud to another as a new experience. That is, it is not the technology itself, but the change in technology solutions, in this case the movement of the workload, that is new to the customer or user, and which may cause some anxiety and resistance on the part of the user. In some cases, where a human is the ultimate decision maker for adoption of a technology change, such as workload movement or a change from one technology solution to another technology solution, human anxiety may actually result in a resistance to migration from an existing solution to a new solution, where such a migration process may be referred to herein as 'repatriation.' One example of such a new solution is the Dell Technologies APEX Cloud Services ('APEX'), which may enable customers to combine the power and speed of a public cloud with the control and security of the customer data center.

Research, such as that which resulted in modern cognitive behavioral therapy techniques, shows that the anxiety response that results in resistance to change, such as repatriation of workloads from a hyperscaler environment to APEX for example, may be mitigated through the use of microsteps, or a series of small changes that may reduce user anxiety by desensitizing the user to the change.

Example embodiments may employ microsteps, or the breakdown of technology changes, such as workload migration for example, recommendations into manageable stages, to increase exposure and eventual adoption of the technology change. One result of this approach may be the conversion of a person who may otherwise have resisted mass-recommendations to increase the likelihood of larger adoption of, for example, a new technology, or a migration of a workload. In this way, technology changes, which may be important to an enterprise, may be effectively implemented notwithstanding resistance from affected users.

B. Aspects of Some Example Embodiments

Embodiments of the invention may generally be directed to microstep tracking and recommendations concerning a technology change. As used herein, 'technology change' is intended to be broad in scope and embraces, but is not limited to, a change such as a migration of a computing workload from one site or platform to another site or platform, or a change from one technology platform to another technology platform. Technology changes may be such that they may be implemented incrementally over a period of time. Embodiments of the invention are not limited to any particular period of time, nor to any particular number of incremental changes or implementations. The nature of a technology change may be such that the technology change is perceptible by, and may affect, or provoke a particular response by, a human user.

With reference now to FIG. 1, details are provided concerning aspects of example embodiments of the invention. In general, FIG. 1 discloses an example workflow, or method, 100 for microstep tracking and recommendations. In one particular embodiment, a user and their organization may be required to sign up for a new infrastructure service, such as APEX for example. Note that reference to APEX is only by way of example, and the scope of the invention is not so limited. More generally, example embodiments embrace, but are not limited to, all IaaS (Infrastructure as a Service), PaaS (Platform as a Service), SaaS (Software as a Service), and cloud computing vendors.

Methods such as the method 100 may be performed at/by various computing entities. In some embodiments, for example, part or all of the method 100 may be performed at a target platform to which a workload is being considered for migration, and the target platform may be is able to communicate with a platform where a workload is then being performed. In other example embodiments, a method such as the method 100 may be implemented in whole or in part by an orchestrator site or platform which may communicate with both the current platform and the target platform. Finally, a microstep service may be implemented that performs part or all of methods such as the method 100. The microstep service may be provided, for example, in an 'aaS' ( . . . as a Service) mode to users and platforms.

The example method 100 may begin after a user provides read-only or read-write access to their existing cloud services. In this way, another party may become, or be made, aware of the cloud services in use by the user. The user may register 102 in a database 202, such as in a RBAC (Role Based Access Control), LDAP (Lightweight Directory Access Protocol), or other role-based access database, and then the user may link 104 to the database 202.

Next, the user workloads and their respective workload values may be discovered and ingested 106 into a database 204. For a new user, a default microstep score of "0" may be assigned to that user, and that score may then be added to a microstep score database 206. Default scores greater than "0" may be assigned in some circumstances such as, for example, in the case of a user who may be involved in a technology change that is new to that user, but who has previously indicated some level of amenability to the implementation of other technology changes.

In one example scoring scheme, a "0" value indicates a complete lack of acceptance, by a user, of a particular technology change, while a score of "100" may indicate the full confidence of the user in the particular technology change. This particular scoring scheme is presented only by way of example, and any other scheme or formula that reflects the relative amenability of a user to a technology change may be employed instead.

The discovered workloads 106 may comprise, or consist of, one or more migratable workloads, that is, workloads that can be moved from the current platform where they are executed to a new platform. A workload may be considered as migratable if the workload is executable on the new, target, platform. If the workload is not executable on the target platform, it may be considered as not being migratable, at least with respect to the target platform, although the workload may be migratable to a different target platform.

At 108, various further processes may be performed. For example, a microstep service filter may filter the discovered workloads. In some embodiments, the filtering 108 may comprise examining the discovered workloads to identify which, if any, of the discovered workloads are migratable to a target platform, or are migratable at all. As to the latter, there may be instances when a workload cannot be migrated to any other site. This may be due to security, and/or other, considerations.

After non-migratable workloads have been filtered 108 out of the discovered workloads, the migratable workloads may then be ordered by the microstep service according to one or more criteria. For example, the migratable workloads may be ordered according to one or more SLA (Service Level Agreement) parameters. As another example, migratable workloads may additionally, or alternatively, ordered by other descriptors, which may be organization specific, such as usage data of the workload, and owner of the workload, location of the workload.

Where migratable workloads are ordered based on SLA, those workloads may be ordered from 'lowest' to 'highest.' To illustrate, a workload with a relatively low SLA may be one which is not materially affected by downtime, or other workload interruptions, that may occur at times during performance of the workload. By way of contrast, a workload with a relatively high SLA may be one which is required to be performed on an ongoing basis with high reliability/availability, and whose functionality and availability may be materially impaired by interruptions. Thus, for example, a high SLA workload may be required to be running/available 99+% of the time, while a low SLA workload may only be required to be running/available about 60% of the time.

With continued reference to FIG. 1, the microstep service may then use the microscores that have been assigned to one or more workloads to determine 110 which migratable workload(s) to recommend to a user for migration to a target platform. An APEX GUI (Graphical User Interface) or API (Application Program Interface) for example, may retrieve the recommendation from the microstep score database 206 to populate a recommendation display, so as to make the workload recommendation available 112 to a user.

After the recommendation(s) have been made available 112 to a user, the microstep service may then receive input 114 from the user concerning the recommendations. In some embodiments, the input may be binary, that is, either the user accepts the recommendation, or the user rejects the recommendation. If the user accepts the recommendation, the microstep score for that user may be increased, such as by use of a Fibonacci sequence for example, indicating a relative increase in the amenability of the user to the technology change, or portion thereof, that has been recommended. The amount by which a microstep score is increased may be set in the microstep score database 206. When a microstep score has been increased, the next recommendation that is presented may increase the amount of workload recommended to be migrated.

On the other hand, if the user rejects the recommendation, the microstep score for that user may be decreased, indicating a relative decrease in the amenability of the user to the technology change, or portion thereof, that has been recommended. The amount by which a microstep score is decreased may be set in the microstep score database 206. When a microstep score has been decreased in response to a user rejection of a recommendation, the next recommendation may be for smaller workload breakdown, that is, the recommendation may be for a relatively smaller portion of the workload to be migrated. The recommendations following an increase, or decrease, in microstep score may also be based on other considerations as well, such as the SLA of the workload(s) concerning which the microstep score was changed.

Finally, microstep score changes may be recorded to provide an audit trail for a particular user and/or workload. The microstep score changes may also be used to refine recommendations made by an algorithm.

Note that microstep scores, and changes, may be collected and evaluated to identify users who may be chronically resistant to technology changes. In some instances, training may be provided to such users to identify, and reduce or eliminate, the anxiety or other user characteristics that contribute to low microstep scores. In this way, it may be possible over time for the user to become more comfortable with technology changes, which may in turn result in quicker adoption and implementation of those technology changes.

With continued reference to FIG. 1, details are provided concerning an example methodology 200 for determining 110 which workload(s) to recommend to a user for migration. In this example, for which an algorithm is provided below, scores may range from 0% (no acceptance of a recommendation) to 100% (full acceptance of a recommendation).

Example Algorithm:

If Score = 0 {Suggest one workload, Lowest SLA}
If Score > 0 && < 10 {Suggest 50% of SLA = Lowest workloads}
If Score > 10 && < 50 {Suggest all worktoads = Lowest SLA
Suggest 1 workload = Medium SLA}
If Score > 50 && < 75{Suggest all workloads = Lowest SLA
Suggest all workload = Medium SLA}
If Score > 75 && < 90 {Suggest all workloads = Lowest SLA
Suggest all workload = Medium SLA Suggest 1 workload = High SLA}
else if Score > 90 {Suggest all workloads};

As shown in this example algorithm, an initial microstep score for a user may be set to "0" but other non-zero default values could be used. If the initial score is 0, the recommendation may be correspondingly modest, such as 'suggest one workload, with lowest SLA' for migration. The recommendation in this example may reflect that the user is, or expected to be, highly resistant to the technology change so the incremental change that is recommended may have a correspondingly low scope and impact. As another example, if the microstep score for a workload is between 0 and 10, the recommendation may be more ambitious, such as 'suggest 50% of the lowest SLA workloads' for migration.

If/as the microstep score continues to increase, the recommendations that are made may reflect the increasing acceptance of the workload migration by the user. Thus, in the example algorithm, the low SLA workloads may be recommended first, and medium SLA workloads recommended after the microstep score has begun to increase. As well, the number of workloads recommended for migration may increase as the microstep score is incremented upwards. Thus, the initial recommendation was to migrate a single, low SLA, workload. Later recommendations may include, as shown in the example, a recommendation that 50% of the low SLA workloads be migrated, and a recommendation that all low SLA workloads, and 1 medium SLA workload, be migrated. The mix of different SLA workloads, and the number of workloads, in any recommendation may be selected as needed. As a final example, if the microstep score is high, such as 90 for example, the recommendation may simply be to migrate all workloads, without regard to SLA.

It will be appreciated that the methodology 200, embodied by the algorithm above, is presented only by way of illustration, and is not intended to limit the scope of the invention in any way. More generally, and as will be understood in light of this disclosure, any algorithm that generates technology change recommendations, while taking into account a relative resistance of a user to the change, may be employed.

C. Example Methods

It is noted with respect to the example method of FIG. 1 that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

D. Further Discussion

As will be apparent from this disclosure, example embodiments may provide a variety of advantages and useful functionalities. For example, embodiments may employ microstep tracking, discoverable workload details, and a microstep service for filtering and ordering of workloads for use in stepped recommendation of workload migration. Embodiments may implement updating of microstep based on user-acceptance of recommendations in an audited feedback loop. Embodiments may employ a feedback loop for improved migration recommendations across users and organizations of similar profiles.

E. Further Example Embodiments

Following are some further example embodiments of the invention. These are presented only by way of example and are not intended to limit the scope of the invention in any way.

Embodiment 1

A method, comprising: discovering computing workloads that are available to migrate from a current platform to a target platform, and the workloads are controlled by a user; determining that the computing workloads are migratable from the current platform to the target platform; ordering the computing workloads according to a respective measurable aspects (such SLA (Service Level Agreement)) of each of the computing workloads; and generating a recommendation that one of the computing workloads be migrated to the target platform, and the recommendation is generated based on a microstep score that has been assigned to the user.

Embodiment 2

The method as recited in embodiment 1, wherein the microstep score is increased when the user accepts the recommendation, and the microstep score is decreased when the user rejects the recommendation.

Embodiment 3

The method as recited in any of embodiments 1-2, wherein ordering the computing workloads according to the respective measurable aspect (such as SLA) of each of the computing workloads comprises ordering the workloads from lowest SLA to highest SLA.

Embodiment 4

The method as recited in any of embodiments 1-3, wherein the recommendation is generated based on the measurable aspect (such as SLA for example) of the computing workload that was recommended for migration.

Embodiment 5

The method as recited in any of embodiments 1-4, determining that the computing workloads are migratable from the current platform to the target platform comprises applying a filter to the computing workloads available for migration to filter out computing workloads that are not available for migration.

Embodiment 6

The method as recited in any of embodiments 1-5, further comprising applying a secondary filter to the migratable computing workloads.

Embodiment 7

The method as recited in any of embodiments 1-6, further comprising assigning the microstep score to the user.

Embodiment 8

The method as recited in any of embodiments 1-7, further comprising migrating, when the user accepts the recommendation, the computing workload identified in the recommendation to the target platform.

Embodiment 9

The method as recited in any of embodiments 1-8, wherein the first platform is a hyperscaler environment.

Embodiment 10

The method as recited in any of embodiments 1-9, further comprising retaining a history of the computer workloads, recommendation, and microstep score, and using the history as a basis for a future recommendation.

Embodiment 11

A method for performing any of the operations, methods, or processes, or any portion of any of these, disclosed herein.

Embodiment 12

A non-transitory storage medium having stored therein instructions that are executable by one or more hardware processors to perform operations comprising the operations of any one or more of embodiments 1-11.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 2:
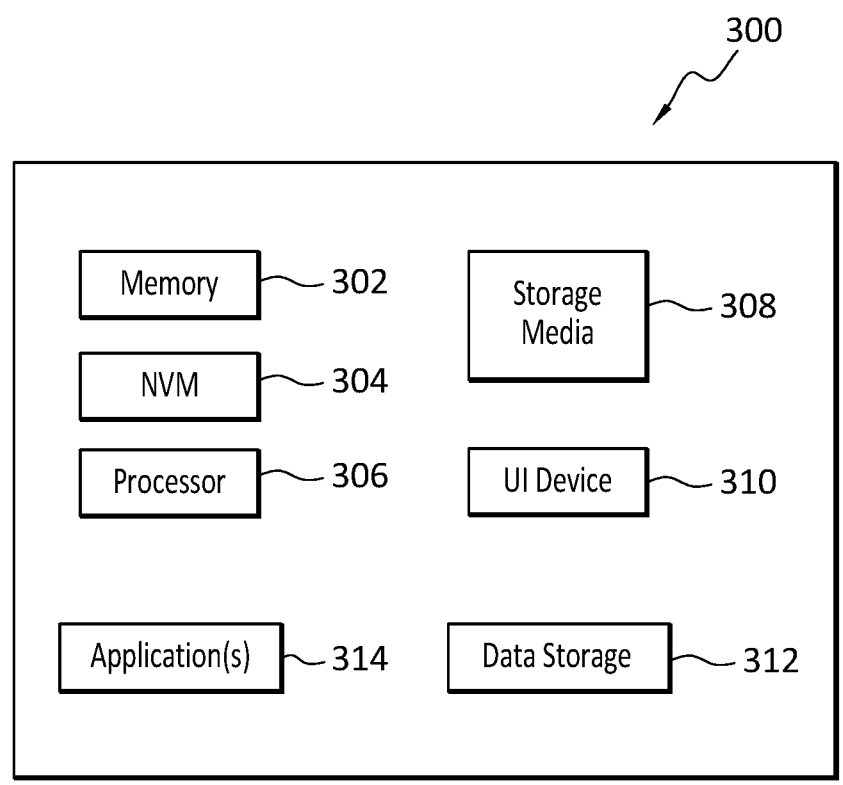
FIG. 2 discloses aspects of a computing entity operable to perform any of the disclosed methods, processes, and operations.

With reference briefly now to FIG. 2, any one or more of the entities disclosed, or implied, by FIG. 1 and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 2.

In the example of FIG. 2, the physical computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI device 310, and data storage 312. One or more of the memory components 302 of the physical computing device 300 may take the form of solid state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
discovering computing workloads that are available to migrate from a current platform to a target platform, wherein the workloads are controlled by a user;
determining that the computing workloads are migratable from the current platform to the target platform;
ordering the computing workloads according to a respective measurable aspect of each of the computing workloads;
generating a recommendation that one of the computing workloads be migrated to the target platform, wherein the recommendation is generated based on a microstep score that has been assigned to the user; and
migrating, when the user accepts the recommendation, the computing workload identified in the recommendation to the target platform,
wherein, when the microstep score is greater than a threshold, all of the computing workloads are recommended for migration regardless of respective Service Level Agreements (SLAs) associated with the computing workloads.

2. The method as recited in claim 1, wherein the microstep score is increased when the user accepts the recommendation, and the microstep score is decreased when the user rejects the recommendation.

3. The method as recited in claim 1, wherein ordering the computing workloads according to the respective measurable aspect of each of the computing workloads comprises ordering the workloads from a lowest SLA (Service Level Agreement) to highest SLA.

4. The method as recited in claim 1, wherein the recommendation is generated based on the measurable aspect of the computing workload that was recommended for migration.

5. The method as recited in claim 1, determining that the computing workloads are migratable from the current platform to the target platform comprises applying a filter to the computing workloads available for migration to filter out computing workloads that are not available for migration.

6. The method as recited in claim 5, further comprising applying a secondary filter to the migratable computing workloads.

7. The method as recited in claim 1, further comprising assigning the microstep score to the user.

8. The method as recited in claim 1, wherein the current platform is a hyperscaler environment.

9. The method as recited in claim 1, further comprising retaining a history of the computer workloads, recommendation, and microstep score, and using the history as a basis for a future recommendation.

10. A computer readable storage medium having stored therein instructions that are executable by one or more hardware processors to perform operations comprising:
discovering computing workloads that are available to migrate from a current platform to a target platform, wherein the workloads are controlled by a user;
determining that the computing workloads are migratable from the current platform to the target platform;
ordering the computing workloads according to a respective SLA (Service Level Agreement) of each of the computing workloads;
generating a recommendation to the user that one of the computing workloads be migrated to the target platform, wherein the recommendation is generated based on a microstep score that has been assigned to the user; and
migrating, when the user accepts the recommendation, the computing workload identified in the recommendation to the target platform,
wherein, when the microstep score is greater than a threshold, all of the computing workloads are recommended for migration regardless of respective Service Level Agreements (SLAs) associated with the computing workloads.

11. The computer readable storage medium as recited in claim 10, wherein the microstep score is increased when the user accepts the recommendation, and the microstep score is decreased when the user rejects the recommendation.

12. The computer readable storage medium as recited in claim 10, wherein ordering the computing workloads according to the respective SLA of each of the computing workloads comprises ordering the workloads from lowest SLA to highest SLA.

13. The computer readable storage medium as recited in claim 10, wherein the recommendation is generated based on the SLA of the computing workload that was recommended for migration.

14. The computer readable storage medium as recited in claim 10, determining that the computing workloads are migratable from the current platform to the target platform comprises applying a filter to the computing workloads available for migration to filter out computing workloads that are not available for migration.

15. The computer readable storage medium as recited in claim 14, wherein the operations further comprise applying a secondary filter to the migratable computing workloads.

16. The computer readable storage medium as recited in claim 10, wherein the operations further comprise assigning the microstep score to the user.

17. The computer readable storage medium as recited in claim 11, wherein the current platform is a hyperscaler environment.

18. The computer readable storage medium as recited in claim 10, wherein the operations further comprise retaining a history of the computer workloads, recommendation, and microstep score, and using the history as a basis for a future recommendation.

* * * * *